(12) United States Patent
Itakura

(10) Patent No.: US 11,047,361 B2
(45) Date of Patent: Jun. 29, 2021

(54) WIND POWER GENERATION SYSTEM USING KITE-SHAPE STRUCTURE STAYING IN THE AIR

(71) Applicant: Toyota Jidosha Kabushiki Kaisha, Toyota (JP)

(72) Inventor: Eiji Itakura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/657,074

(22) Filed: Oct. 18, 2019

(65) Prior Publication Data
US 2020/0182221 A1 Jun. 11, 2020

(30) Foreign Application Priority Data

Dec. 11, 2018 (JP) .............................. JP2018-232056

(51) Int. Cl.
| | |
|---|---|
| *F03D 5/00* | (2006.01) |
| *F03D 9/25* | (2016.01) |
| *F03D 13/20* | (2016.01) |
| *B64C 31/06* | (2020.01) |

(52) U.S. Cl.
CPC ............... *F03D 5/00* (2013.01); *B64C 31/06* (2013.01); *F03D 9/257* (2017.02); *F03D 13/20* (2016.05); *F05B 2240/917* (2013.01); *F05B 2240/921* (2013.01)

(58) Field of Classification Search
CPC . F03D 5/00; F03D 13/20; F03D 9/257; B64C 31/06; F05B 2240/917; F05B 2240/921
USPC ......... 290/44, 55; 244/153 R, 155 A, 153 A; 700/295
See application file for complete search history.

(56) References Cited

U.S. PATENT DOCUMENTS

| | | | | |
|---|---|---|---|---|
| 6,072,245 A | * | 6/2000 | Ockels | ...................... F03D 9/25 290/55 |
| 6,254,034 B1 | * | 7/2001 | Carpenter | ................. F03D 9/11 244/153 R |
| 6,523,781 B2 | * | 2/2003 | Ragner | ................ A63H 27/002 244/153 R |

(Continued)

FOREIGN PATENT DOCUMENTS

| | | |
|---|---|---|
| EP | 0391601 A2 | 10/1990 |
| JP | 02-275100 A | 11/1990 |

(Continued)

*Primary Examiner* — Pedro J Cuevas
(74) *Attorney, Agent, or Firm* — Dinsmore & Shohl LLP

(57) ABSTRACT

In a system of the disclosure, power generation devices installed at separate places include a kite-shaped flying object staying in the air, a generator installed on a ground and a tether operatively connecting the two to each other. The tether, which is pulled when the kite-shaped flying object rises, rotates a rotor of a generator to generate power. A power supply controller controls power supply such that, when power suppliable from a power generation device meets a target power needed by a power receiving facility, power is supplied from the power generation device to the power receiving facility, and when the target power of the power receiving facility exceeds the power suppliable from the power generation device, power from another power generation device is supplied to the power receiving facility.

14 Claims, 8 Drawing Sheets

(56) References Cited

U.S. PATENT DOCUMENTS

| | | | |
|---|---|---|---|
| 7,188,808 B1* | 3/2007 | Olson | F03D 5/00 244/153 R |
| 7,210,896 B2* | 5/2007 | Knott | F03D 13/20 415/4.3 |
| 7,504,741 B2* | 3/2009 | Wrage | F03D 5/00 290/55 |
| 7,656,053 B2* | 2/2010 | Griffith | F03D 7/00 290/44 |
| 7,778,940 B2* | 8/2010 | Mazzarella | H02J 3/004 705/412 |
| 7,861,973 B1* | 1/2011 | Olson | F03D 13/20 244/155 A |
| 8,066,225 B1* | 11/2011 | Tigner | F03D 5/00 244/153 R |
| 8,278,776 B1* | 10/2012 | Arntz | F03D 5/00 290/54 |
| 8,405,244 B2* | 3/2013 | Zhang | F03B 17/06 290/55 |
| 8,738,193 B2* | 5/2014 | Furuichi | H02J 13/0006 700/295 |
| 8,786,139 B2* | 7/2014 | Cummings | H01L 31/02021 307/151 |
| 8,922,041 B1* | 12/2014 | North | G05D 1/08 290/44 |
| 8,922,046 B2* | 12/2014 | Vander Lind | B64C 31/06 290/55 |
| 8,975,771 B2* | 3/2015 | Goldstein | F03D 5/00 290/55 |
| 9,046,072 B2* | 6/2015 | Tattersfield | F03D 9/28 |
| 9,080,550 B2* | 7/2015 | Goldstein | F03D 5/00 |
| 9,136,703 B2* | 9/2015 | Cummings | H02J 3/00 |
| 9,136,704 B2* | 9/2015 | Cummings | H01L 31/02021 |
| 9,239,041 B2* | 1/2016 | Goldstein | F03D 5/06 |
| 9,300,133 B2* | 3/2016 | Cummings | H02J 1/102 |
| 9,300,137 B2* | 3/2016 | Cherian | H02J 13/00004 |
| 9,464,624 B2* | 10/2016 | Calverley | B65H 75/4481 |
| 9,470,206 B2* | 10/2016 | Calverley | B64C 39/022 |
| 9,470,207 B2* | 10/2016 | Calverley | G05D 1/0866 |
| 9,581,139 B2* | 2/2017 | Fortmann | H02J 3/381 |
| 9,599,995 B2* | 3/2017 | North | G05D 1/08 |
| 9,643,721 B2* | 5/2017 | Schaefer | H02K 7/1853 |
| 9,755,430 B2* | 9/2017 | Paquin | H02J 3/381 |
| 9,759,188 B2* | 9/2017 | Calverley | B64C 27/02 |
| 9,764,834 B2* | 9/2017 | Hardy | F03D 9/25 |
| 9,800,052 B2* | 10/2017 | Li | H02J 3/383 |
| 10,113,534 B2* | 10/2018 | Sia | F03D 5/00 |
| 10,516,269 B2* | 12/2019 | Dall'Anese | H02J 3/46 |
| 10,594,139 B2* | 3/2020 | Matsuo | H02J 3/38 |
| 10,697,433 B2* | 6/2020 | Kingsley | F03D 9/19 |
| 10,742,035 B2* | 8/2020 | Williams | H01F 29/14 |
| 10,914,289 B2* | 2/2021 | Baun | F03D 13/10 |
| 2002/0040948 A1* | 4/2002 | Ragner | F03D 13/20 244/153 R |
| 2008/0077368 A1* | 3/2008 | Nasle | G05B 17/02 703/4 |
| 2008/0109205 A1* | 5/2008 | Nasle | G06F 30/20 703/18 |
| 2008/0120080 A1* | 5/2008 | Nasle | G05B 23/0272 703/13 |
| 2008/0231058 A1* | 9/2008 | Nicholson | F03D 5/00 290/55 |
| 2008/0262820 A1* | 10/2008 | Nasle | G06N 20/00 703/18 |
| 2009/0072092 A1* | 3/2009 | Griffith | B64C 31/06 244/155 A |
| 2009/0289148 A1* | 11/2009 | Griffith | B63H 9/08 244/155 R |
| 2010/0026007 A1* | 2/2010 | Bevirt | F03D 5/00 290/55 |
| 2010/0232988 A1* | 9/2010 | Creighton | F03D 5/00 417/334 |
| 2010/0276941 A1* | 11/2010 | Zhang | F03D 5/06 290/55 |
| 2010/0283253 A1* | 11/2010 | Bevirt | F03D 9/32 290/55 |
| 2010/0295383 A1* | 11/2010 | Cummings | H02J 3/00 307/151 |
| 2011/0015801 A1* | 1/2011 | Mazzarella | G06Q 50/06 700/297 |
| 2011/0035073 A1* | 2/2011 | Ozog | H02J 13/00034 700/291 |
| 2011/0054709 A1* | 3/2011 | Son | H02J 3/06 700/286 |
| 2011/0071970 A1* | 3/2011 | Massie | H02J 3/00 706/21 |
| 2011/0093127 A1* | 4/2011 | Kaplan | G06Q 10/04 700/292 |
| 2011/0266395 A1* | 11/2011 | Bevirt | D07B 5/005 244/155 R |
| 2011/0270460 A1* | 11/2011 | Furuichi | H02J 3/14 700/295 |
| 2012/0029720 A1* | 2/2012 | Cherian | H02J 13/00 700/297 |
| 2012/0065792 A1* | 3/2012 | Yonezawa | H02J 3/14 700/291 |
| 2012/0104763 A1* | 5/2012 | Lind | B64C 31/06 290/55 |
| 2012/0235417 A1* | 9/2012 | Arntz | F03D 5/00 290/55 |
| 2013/0006431 A1* | 1/2013 | Marroyo Palomo | H02J 3/381 700/287 |
| 2013/0046415 A1* | 2/2013 | Curtis | H02J 3/383 700/297 |
| 2013/0134261 A1* | 5/2013 | Goldstein | F03D 5/00 244/155 A |
| 2013/0249319 A1* | 9/2013 | Cummings | H02J 1/102 307/131 |
| 2013/0285377 A1* | 10/2013 | Tattersfield | F03D 9/28 290/44 |
| 2014/0210212 A1* | 7/2014 | Hardy | F03D 5/00 290/55 |
| 2014/0306533 A1* | 10/2014 | Paquin | H02J 1/00 307/52 |
| 2014/0316599 A1* | 10/2014 | Tomita | H02J 3/14 700/295 |
| 2014/0319917 A1* | 10/2014 | Cummings | H02J 3/00 307/63 |
| 2014/0321057 A1* | 10/2014 | Cummings | H01L 31/02021 361/699 |
| 2014/0326831 A1* | 11/2014 | Vander Lind | A63H 27/002 244/155 A |
| 2015/0097086 A1* | 4/2015 | Schaefer | B64C 39/022 244/175 |
| 2015/0112501 A1* | 4/2015 | Rombouts | H02J 3/14 700/295 |
| 2015/0130188 A1* | 5/2015 | Goldstein | F03D 9/25 290/44 |
| 2015/0153741 A1* | 6/2015 | North | F03D 5/06 290/44 |
| 2015/0184640 A1* | 7/2015 | Fortmann | F03D 7/028 290/44 |
| 2015/0251754 A1* | 9/2015 | Vander Lind | B64C 13/24 290/55 |
| 2015/0251755 A1* | 9/2015 | Schaefer | H02K 7/1853 290/55 |
| 2015/0308410 A1* | 10/2015 | Goldstein | F03D 5/06 290/55 |
| 2015/0308411 A1* | 10/2015 | Goldstein | F03D 7/00 290/44 |
| 2016/0252922 A1* | 9/2016 | Reifenhauser | H04L 67/32 700/295 |
| 2017/0310115 A1* | 10/2017 | Miyake | H02J 3/382 |
| 2018/0320277 A1* | 11/2018 | Kingsley | F03D 9/19 |
| 2018/0375333 A1* | 12/2018 | Matsuo | H02J 3/48 |
| 2019/0032636 A1* | 1/2019 | Geisler | H02J 3/386 |
| 2019/0312430 A1* | 10/2019 | Williams | H02J 3/28 |
| 2020/0036225 A1* | 1/2020 | Kolling | H02J 13/0079 |
| 2020/0056584 A1* | 2/2020 | Sia | F03D 1/00 |
| 2020/0080541 A1* | 3/2020 | Bourgault | F03D 9/28 |

(56) References Cited

U.S. PATENT DOCUMENTS

| | | | | |
|---|---|---|---|---|
| 2020/0083711 A1* | 3/2020 | Kanou | .................... | H02J 3/38 |
| 2020/0362814 A1* | 11/2020 | Nielsen | .................. | B64C 31/06 |
| 2020/0378362 A1* | 12/2020 | Kullander | ............... | F03D 7/048 |
| 2020/0408183 A1* | 12/2020 | Saiz | .......................... | F03D 9/25 |
| 2021/0033069 A1* | 2/2021 | Lindholm | ............... | B64C 31/06 |
| 2021/0047033 A1* | 2/2021 | Ruiterkamp | ............ | B64C 19/00 |

FOREIGN PATENT DOCUMENTS

| | | |
|---|---|---|
| JP | 11-291995 A | 10/1999 |
| JP | 2002-205693 A | 7/2002 |
| JP | 2004-232461 A | 8/2004 |
| JP | 2009-509094 A | 3/2009 |
| JP | 2009-542955 A | 12/2009 |
| JP | 2012-515877 A | 7/2012 |
| JP | 2015-507569 A | 3/2015 |
| JP | 2015-530954 A | 10/2015 |
| JP | 2017-154595 A | 9/2017 |
| JP | 2017-534801 A | 11/2017 |
| JP | 2017-535921 A | 11/2017 |
| JP | 2018-502799 A | 2/2018 |
| WO | 2007034193 A2 | 3/2007 |
| WO | 2008004261 A1 | 1/2008 |
| WO | 2010084520 A1 | 7/2010 |
| WO | 2013096345 A1 | 6/2013 |
| WO | 2014029477 A1 | 2/2014 |
| WO | 2016062735 A1 | 4/2016 |
| WO | 2016075461 A1 | 5/2016 |
| WO | 2016083822 A1 | 6/2016 |

* cited by examiner

WIND POWER GENERATION SYSTEM USING KITE-SHAPE STRUCTURE STAYING IN THE AIR

CROSS-REFERENCE TO RELATED APPLICATIONS

This application claims priority to Japanese Patent Application No. 2018-232056 filed on Dec. 11, 2018, which is incorporated herein by reference in its entirety including the specification, drawings and abstract.

BACKGROUND

1. Technical Field

The disclosure relates to a wind power generation system, and more particularly, to a wind power generation system that converts a wind power received by a kite-shaped flying object staying in the air in a state of being moored by a tether (a mooring cord, a mooring cable), into electric power. In the specification, the kite-shaped flying object refers to a structure capable of being lifted up into the air by wind power, and staying and standing still in the air in a state of being moored by a tether, such as a kite, a paraglider or the like.

2. Description of Related Art

In the related art, various configurations have been suggested for performing wind power generation by lifting a flying object staying in the air, such as a kite, a balloon, an airship, an aircraft, an artificial satellite, or the like (see, for example, Japanese Unexamined Patent Application Publication No. 2-275100 (JP 2-275100 A), Japanese Unexamined Patent Application Publication (Translation of PCT Application) No. 2015-507569 (JP 2015-507569 A), Japanese Unexamined Patent Application Publication (Translation of PCT Application) No. 2017-535921 (JP 2017-535921 A), Japanese Unexamined Patent Application Publication (Translation of PCT Application) No. 2009-542955 (JP 2009-542955 A), Japanese Unexamined Patent Application Publication (Translation of PCT Application) No. 2015-530954 (JP 2015-530954 A), Japanese Unexamined Patent Application Publication (Translation of PCT Application) No. 2012-515877 (JP 2012-515877 A), Japanese Unexamined Patent Application Publication (Translation of PCT Application) No. 2017-534801 (JP 2017-534801 A), Japanese Unexamined Patent Application Publication (Translation of PCT Application) No. 2018-502799 (JP 2018-502799 A), Japanese Unexamined Patent Application Publication No. 2004-232461 (JP 2004-232461 A), and Japanese Unexamined Patent Application Publication (Translation of PCT Application) No. 2009-509094 (JP 2009-509094 A)). As one example, as disclosed in, for example, JP 2-275100 A, JP 2015-507569 A, JP 2017-535921 A and the like, a configuration of a rotary generator has been known where the rotary generator is mounted on a wing of a flying object staying in the air and has a wind turbine mounted on a rotating shaft thereof to convert wind power rotating the wind turbine into electric power. In addition, JP 2009-542955 A and JP 2015-530954 A disclose a power generating configuration in which, by connecting a flying object staying in the air to a rotating shaft of a generator disposed on the ground through a tether, rotational power generated when the flying object turns in the air by wind power is converted into electric power. Furthermore, JP 2012-515877 A, JP 2017-534801 A, JP 2018-502799 A, JP 2004-232461 A, JP 2009-509094 A, or the like disclose a power generating configuration in which, a tether, which is capable of being wound on a rotating body operatively connected to a rotor of a generator disposed on the ground, is connected to a flying object, and when the lift force of wind makes the flying object rising into the air, rotational power generated when the tether connected to a staying structure is unwound from the rotating body is converted into electric power. As an example of the configuration, JP 2004-232461 A and JP 2009-509094 A disclose a configuration in which power generation is achieved by connecting two kites to a rotating shaft of a generator on the ground through respective tethers and alternately repeating rise and fall of the kites such that the rotating shaft of the generator is continuously rotated.

SUMMARY

Recently, a system has been considered in which a kite-shaped flying object is lifted up to a high-altitude region in a range of several kilometers (approximately 3 km) above and below an altitude of approximately 11 km from the ground level, where strong airflow such as a westerly wind and a trade wind flows all the time, and the kite-shaped flying object is used as a staying-in-the-air platform or mother ship for a base (or base station) for wind power generation by airflow energy. Particularly, the kite-shaped flying object is very advantageous from the viewpoint of energy saving since the kite-shaped flying object mainly uses, as energy for lifting-up and staying in the air, the energy of airflow flowing in the high-altitude region, such as a westerly wind and a trade wind.

As described above, in the configuration in which power is generated by the kite-shaped flying object using strong airflow in the air as a source of energy, a ground end of the tether mooring the kite-shaped flying object is connected to a generator (typically, the tether is wound on a rotating body (reel) operatively connected to a rotor of the generator), and rising energy (wind power energy) generated when the kite-shaped flying object rises by receiving airflow is converted into electrical energy through the extension of the tether accompanying the rising of the kite-shaped flying object (typically, the rotor of the generator is rotated by the unwinding of the tether that has been wound on the rotating body connected to the rotor of the generator). When power is generated by converting the wind power received by the kite-shaped flying object during rising into electric power, the power obtained is determined by the lift force produced on the kite-shaped flying object, the lift force varies depending on wind conditions such as the wind speed (strength of the airflow), the fluctuation amount thereof, a direction or the like of the region of the kite-shaped flying object staying in the air. The wind conditions vary from time to time, from time of day to time of day, from day to day, or from season to season, so electric power that can be obtained from a power generation device (device in which the kite-shaped flying object is connected to the generator through the tether) using a kite-shaped flying object at one place varies with variation of the wind condition. As a result, with just the power generation device of the kite-shaped flying object at one place, power demand at a certain place cannot be always met, that is, target power cannot be achieved. In this regard, wind power enough to achieve target power cannot be obtained with just the power generation device at a certain place as described above. However, since wind conditions in each region usually varies from place to place, for example, when wind power, that is, lift force by which the kite-shaped flying object can be made to rise, is observed at a plurality of places, wind power at some places decreases whereas wind power at other places increases. For this reason, considering a system provided in which the power generation device using the kite-shaped flying object is installed at a plurality of different places and power is transmitted so as to cover the common power demand by power from each of power generation devices, even though power which a power generation device at a certain place can supply is decreased, for example, due to variation in wind conditions at the place, the decreased amount of power can be supplied from the power generation device at another place to meet the power demand. For that purpose, it is needed to grasp the power that each power generation device can supply according to wind conditions at places where a plurality of power generation devices are installed.

An object of the disclosure is to provide a power generation system including a power generation device that makes a kite-shaped flying object stay in the air and converts wind power energy received by the kite-shaped flying object into electrical energy (hereinafter the term "power generation device" refers to the power generation device using the kite-shaped flying object unless otherwise specified). The power generation system is configured such that power generation devices disposed at a plurality of separated places can supply power to a facility (power receiving facility) receiving or consuming common power. In addition, the power generation system is configured such that a plurality of power generation devices can cooperate to stably supply power so as to meet power demand of a common power receiving facility, based on wind conditions at the place where each power generation device is installed.

An aspect of the disclosure relates to a power generation system that supplies power to at least one place, where the power is obtained by converting the energy of wind power received by a kite-shaped flying object staying in the air. The power generation system includes a plurality of power generation devices, at least one power receiving facility, a power transmission network, and a power supply controller. The power generation devices are installed at separate places, and each configured to include a kite-shaped flying object, a generator installed on a ground and a tether. The tether has one end connected to the kite-shaped flying object and the other end wound on a rotating body operatively connected to a rotor of the generator. The generator outputs power when the rotor is rotated by the tether being pulled and unwound from the rotating body as the kite-shaped flying object receiving wind power from airflow in the air rises. The at least one power receiving facility is configured to receive or consume power. The power transmission network is configured to transmit power from each of the power generation devices to each of the at least one power receiving facility. The power supply controller is configured to control power supply from each of the power generation devices to each of the at least one power receiving facility through the power transmission network. The power supply controller is configured to control power supply from each of the power generation devices to each of the at least one power receiving facility such that when a target power, which is a power needed by any one of the at least one power receiving facility, is met by a suppliable power which is a power supplied from one of the power generation devices, power is supplied from the one of the power generation devices to the one power receiving facility through the power transmission network, and when the target power of the one power receiving facility exceeds the suppliable power supplied from the one power generation device, power from one or more of the other power generation devices is supplied to the one power receiving facility through the power transmission network in addition to the power from the one power generation device, so as to meet the target power of the one power receiving facility.

In the system configuration, each of the "power generation devices" includes the "kite-shaped flying object" staying in the air, the "generator" disposed on the ground and the "tether" connected to the kite-shaped flying object and the generator, as described above. In the generator, when the rotating body is rotated by the tether being pulled and unwound from the rotating body by the kite-shaped flying object as the kite-shaped flying object rises and the rotor of the generator connected to the rotating body is rotationally driven, the rotating energy of the rotor is converted into electrical energy (the rotational work rate is converted into electrical power). Here, the "generator" may be any type of rotary generator, for example, various types of synchronous generators, induction generators or direct current generators, and may be a device in which power is output from an output terminal of the generator by rotation of the rotor. As already mentioned earlier, the "kite-shaped flying object" may have any structure, such as that of a kite, a paraglider, or the like, capable of being lifted up by wind power, and staying in the air and standing still in a state of being moored by the tether. The "tether" may be a rope-shaped or string-shaped member formed of any material and mooring the kite-shaped flying object in the air as described above. The rotating body (reel) on which the tether is wound may be directly mounted on the rotor of the generator, or may be operatively connected to the rotor through a speed control mechanism such as a gear mechanism or a pulley mechanism. In addition, in the system configuration, the "power receiving facility" may be any facility that receives power to store or consume the power, and may be, for example, a facility such as a house, a factory, a business office, or the like or equipment for supplying power to a moving object (a vehicle) or the like. The "power transmission network" may be a network commonly used in the field of power equipment for transmitting and distributing power from any power generation device or a power generation equipment (for example, power plant) to a power receiving facility. The "power supply controller" may be a controller monitoring the suppliable power or the maximum generable power of each of the power generation devices and the target power of each power receiving facility, and performing switching of transmission paths from each of the power generation devices to each power receiving facility so as to meet the target power of each power receiving facility, as described above, and may be implemented by any type of computer operation and relays and distribution facilities.

With the power generation system according to the aspect of the disclosure, the power generation devices, each using the kite-shaped flying object, are configured to be able to supply power to each power receiving facility through the power transmission network. Therefore, even though the power (target power) needed by a certain power receiving facility cannot be covered by the suppliable power by one power generation device, the target power is achieved by adding power obtained by another power generation device. As a result, it is possible to more stably meet the power demand even in a situation in which power that can be supplied from each power generation device varies depending on the wind conditions.

In the configuration of the power generation devices in the power generation system according to the aspect of the disclosure, more specifically, the movement of the kite-shaped flying object is alternately repeated between rising and falling in the air, depending on the wind power received by the kite-shaped flying object from the airflow. As described above, when the kite-shaped flying object is rising, the tether is unwound from the rotating body, which, in turn, the rotor of the generator is rotated to generate power, and when the kite-shaped flying object is falling, the tether is wound on the rotating body. When the kite-shaped flying object is falling, since the kite-shaped flying object falls by its own weight, tension is not generated on the tether, and the tether can be wound on the rotating body with little energy consumption (merely with a minimum energy consumption for rotating the rotating body) (therefore, when the kite-shaped flying object is falling, power generation is not performed and power is not output from the generator). The rising and falling of the kite-shaped flying object can be achieved by controlling the attitude (pitch attitude angle) of the kite-shaped flying object staying in the air, or changing a shape of a part of the kite-shaped flying object (such as changing the direction of the tail of the kite-shaped flying object) to control the aerodynamic force generated by the kite-shaped flying object receiving the airflow. When the rising and falling of the kite-shaped flying object is achieved by controlling the pitch attitude angle of the kite-shaped flying object, the pitch attitude angle of the kite-shaped flying object is changed by connecting tethers to the front part and rear part of the kite-shaped flying object, respectively, and adjusting the balance of tension or length of each tether. As a result, the magnitude of the lift force generated during the rising of the kite-shaped flying object is adjusted. On the other hand, when the rising and falling of the kite-shaped flying object is achieved by changing the shape of a part of the kite-shaped flying object, an actuator for changing the direction of the tail in the kite-shaped flying object may be mounted such that the direction of the tail is changed by driving the actuator so as to increase or decrease the magnitude of the lift force generated during the rising of the kite-shaped flying object.

As already mentioned earlier, it has been found that the high-altitude region in which strong airflow such as a westerly wind or a trade wind is always flowing in the air is positioned in a range of approximately 3 km above and below an altitude of approximately 11 km from the ground level, and it is expected that a large amount of power can be obtained by the rising (and falling) of the kite-shaped flying object in the airflow range. Therefore, in the system according to the aspect of the disclosure, the kite-shaped flying object may be controlled to rise and fall in the altitude range in which a westerly wind or a trade wind is generated. Specifically, a wind speed measuring unit that measures a wind speed or a dynamic pressure measuring unit that measures a dynamic pressure of airflow may be provided in the kite-shaped flying object, and a maximum wind speed altitude at which the maximum wind speed is obtained or a maximum dynamic pressure altitude at which the maximum dynamic pressure is obtained may be detected using the wind speed measuring unit or the dynamic pressure measuring unit. The lift force generated in the kite-shaped flying object may be controlled such that the kite-shaped flying object rises or falls between an altitude at which the wind speed or dynamic pressure having a value obtained by multiplying the maximum wind speed or the maximum dynamic pressure by a positive coefficient less than 1 is detected, which is lower than the maximum wind speed altitude or the maximum dynamic pressure altitude, and an altitude at which the wind speed or dynamic pressure having a value obtained by multiplying the maximum wind speed or the maximum dynamic pressure by a positive coefficient less than 1 is detected, which is higher than the maximum wind speed altitude or the maximum dynamic pressure altitude.

In the power generation system according to the aspect of the disclosure, as described above, the power supply controller controls power supply (power distribution) from each of the power generation devices to each power receiving facility, such that when the target power of one power receiving facility is met by the power suppliable from one power generation device, power is supplied from the one power generation device to the one power receiving facility through the power transmission network, and when the target power of the one power receiving facility exceeds the power suppliable from the one power generation device, power from another power generation device or a plurality of power generation devices is supplied to the one power receiving facility through the power transmission network (Here, "power suppliable" from the power generation device refers to available power obtained by subtracting power already set to be supplied to any other power receiving facility and power loss from the maximum power (maximum generable power) that can be generated at the power generation device). More specifically, as one example, with regard to the power supply control, a power generation device having the shortest power transmission distance to each power receiving facility (the power generation device of the shortest-distance) may be selected as a power generation device to supply power to each power receiving facility. When the target power of each power receiving facility is not met just by the power suppliable from the power generation device having the shortest distance to each power receiving facility, one or more of the other power generation devices may be selected in order from the generation device having the next shortest power transmission distance to each power receiving facility. For example, in a case where power is supplied to a power receiving facility from the power generation device having the next shortest distance to the power receiving facility when the target power of the power receiving facility has not been met by the power suppliable from the power generation device having the shortest power transmission distance to the power receiving facility, if the total power supplied to the power receiving facility still does not reach the target power, a power transmission path is controlled such that power is further supplied to the power receiving facility sequentially from the power generation device having the third shortest power transmission distance to the power receiving facility, until the target power is met. With the above-mentioned configuration, the power transmission distance can be made as short as possible. Therefore, it is possible to suppress the loss occurring in the power transmission as low as possible. In addition, as the power supply destination of each of the power generation devices, the power receiving facility having the shortest power transmission distance from each of the power generation devices may be selected preferentially. For example, when power is transmitted from a certain power generation device, the power receiving facility having the shortest power transmission distance from the power generation device may be selected first, and in the maximum generable power of the power generation device, the power corresponding to the target power of the selected power receiving facility may be transmitted to the power receiving facility, and the remaining power in the power generation device may be reserved as the power suppliable to other power receiving facilities. More specifically, in the power supply control, the target power of each power receiving facility and the maximum generable power and/or the suppliable power of each power generation device, where above-mentioned devices are connected to the power transmission network of the system, may be monitored every moment, and power distribution from each of the power generation devices to each power receiving facility may be determined such that the total distance of power transmission distances (the total value of power transmission distances) becomes the shortest, or power loss in the entire system becomes minimized.

In the above-mentioned configuration, the target power of each power receiving facility may be determined by estimating or measuring consumed power or stored power of an electric device used in each power receiving facility by any of methods. The maximum generable power of each of the power generation devices depends on the magnitude of the lift force received by the kite-shaped flying object of each of the power generation devices, and the lift force is determined by the wind speed or dynamic pressure of the airflow. Therefore, as already mentioned earlier, the wind speed measuring unit measuring the wind speed or the dynamic pressure measuring unit measuring the dynamic pressure of the airflow may be provided in the kite-shaped flying object, and the maximum power suppliable from each of the power generation device may be estimated based on values of the detected wind speed or dynamic pressure. The power suppliable from each of the power generation devices is estimated as the value obtained by subtracting power already set to be allocated to a power receiving facility and the power loss from the maximum generable power.

As described above, in the power generation system according to the aspect of the disclosure, the power transmission network is put into place such that power can be transmitted from the power generation devices using kite-shaped flying objects to the common power receiving facility, and when the target power of the power receiving facility is not covered by the power suppliable from one power generation device, the power supply controller performs control such that power obtained from another power generation device is supplied, which makes it possible to achieve supply of target power. In general, in a case of the power generation device using the kite-shaped flying object, it is inevitable, in principle, that power capable of being obtained varies due to change of wind conditions of the region where the kite-shaped flying object is staying in the air (and between the rising and falling of the kite-shaped flying object). According to the embodiment of the disclosure, the fact is considered that, although the wind conditions of the region where the kite-shaped flying object is staying in the air vary from place to place and thus power supplied from a power generation device at one place may not be sufficient or may not be enough, suppliable power can be secured in the power generation devices at separated places. Therefore, as described above, when the target power of one power receiving facility exceeds the power suppliable from one power generation device, power from another power generation device or a plurality of other power generation devices is supplied to the one power receiving facility through the power transmission network, which makes it possible to achieve more stable supply of target power. With the system configuration, it is also expected that wind power generation using airflow energy of a westerly wind or a trade wind flowing in the high-altitude region, which is extremely advantageous from the viewpoint of energy saving, will be more widely spread.

Other objects and advantages of the disclosure will be apparent from the following description of embodiments of the disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1A:
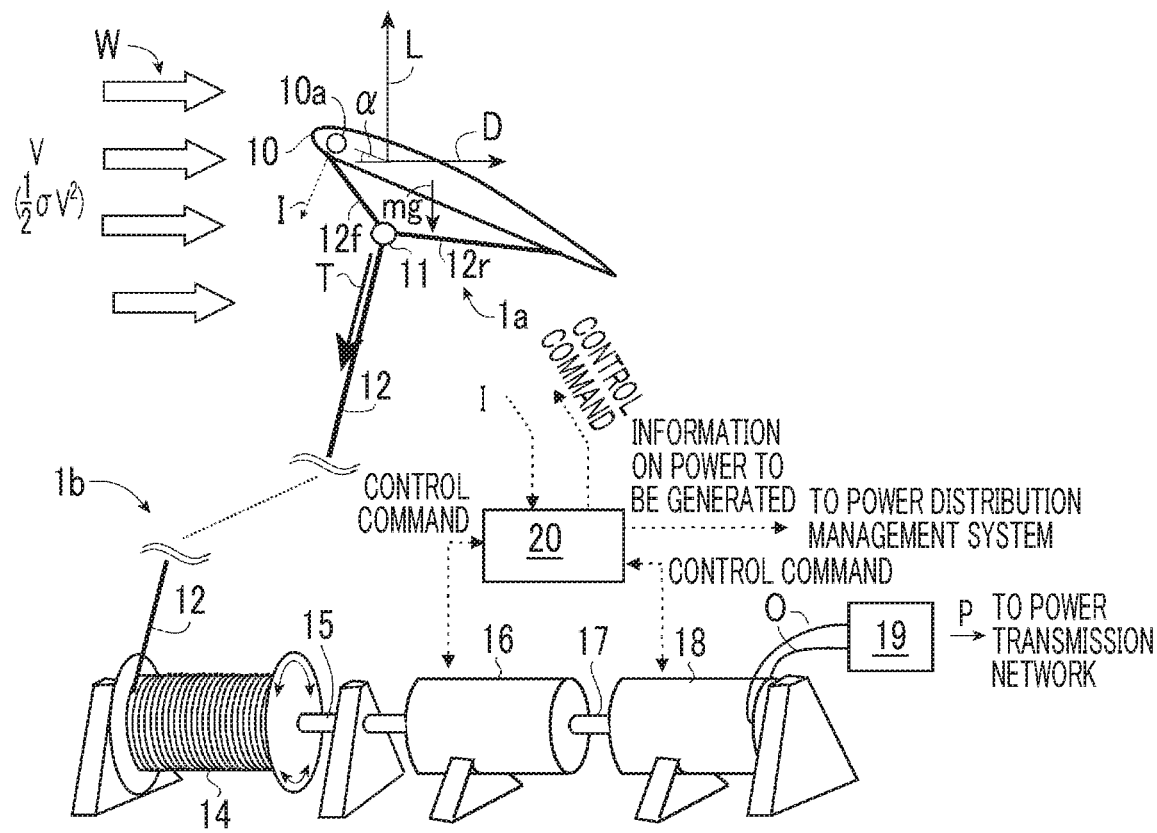
FIG. 1A is a schematic diagram of a kite-shaped flying object and a generator of a power generation device of a power generation system according to an embodiment of the disclosure.

Hereinafter, the disclosure will be described in detail by way of an embodiment with reference to accompanying drawings. In the drawings, the same reference signs indicate the same parts.

Configuration and Operation of Power Generation Device Using Kite-Shaped Flying Object (1) Configuration of Power Generation Device In a power generation system according to an embodiment, a plurality of power generation devices using kite-shaped flying objects are connected to a power transmission network and cooperates to stably supply power. Each of the power generation devices includes an up-in-the-air portion $1a$ and a ground portion $1b$, as schematically illustrated in FIG. 1A.

Figure 2A:
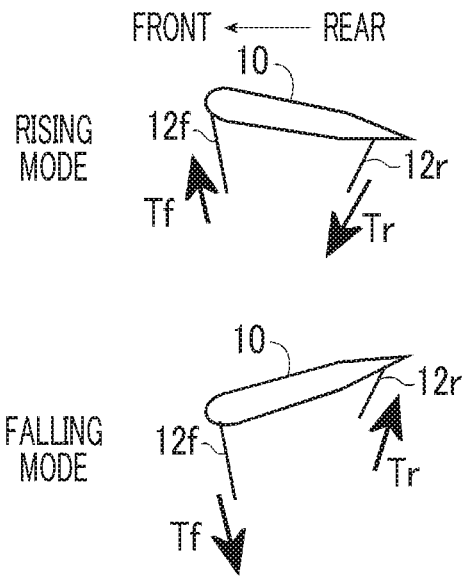
FIG. 2A is a diagram illustrating a pitch attitude control for adjusting a lift force of the kite-shaped flying object of the power generation system according to the embodiment of the disclosure.
Figure 2B:
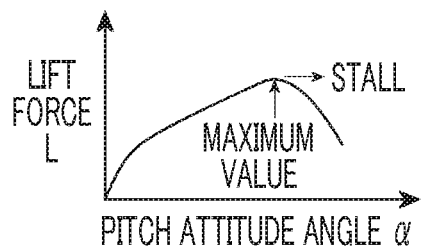
FIG. 2B is a graph schematically illustrating a change in lift force with respect to a pitch attitude angle of the kite-shaped flying object.
Figure 2C:
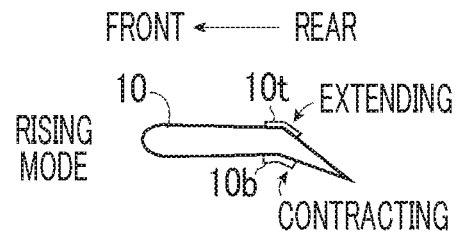
FIG. 2C is a diagram illustrating a shape change control for adjusting a lift force of the kite-shaped flying object of the power generation system according to the embodiment of the disclosure.
Figure 2C:
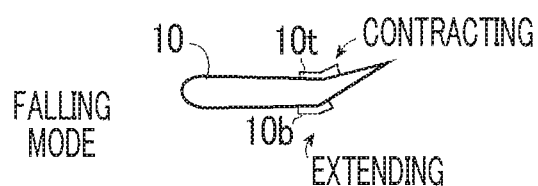

With reference to FIG. 1A, first, the up-in-the-air portion $1a$ includes a kite-shaped flying object 10 being lifted up and staying in the air by airflow W. The kite-shaped flying object 10 may have a front portion and a rear portion connected with a front tether $12f$ and a rear tether $12r$, respectively, into which a tether 12 extending from the ground portion $1b$ is branched by a tether balance adjuster 11, and may be moored to the ground portion $1b$ by the tether 12. As will be described later, the tether balance adjuster 11 may be configured to adjust balance of tensions and/or lengths of the front tether $12f$ and the rear tether $12r$ to increase or decrease an air force (lift force L and drag force D) acting on the kite-shaped flying object against gravity of its own mg and the tension T of the tether to adjust a pitch attitude angle α of the kite-shaped flying object 10 (pitch attitude angle controller), which will be described later. Alternatively, as another form, as illustrated in FIG. 2C, which will be described later, in order to increase or decrease the air force acting on the kite-shaped flying object, actuators $10t$, $10b$ for changing the direction of the tail of the kite-shaped flying object 10 (changing the shape of the kite-shaped flying object) may be provided (kite-shaped flying object shape controller). In addition, in the kite-shaped flying object 10, a sensor group $10a$ for detecting a wind speed (V) and a dynamic pressure ($\frac{1}{2}\rho V^2$) of the airflow received by the kite-shaped flying object 10, and/or an altitude of the kite-shaped flying object 10 may be provided, and a detection value of each sensor may be transmitted to a control device 20 located on the ground portion $1b$, as a signal 1 by any type of communication method. Furthermore, although not illustrated, a control device controlling operations of the tether balance adjuster 11 or the actuators $10t$, $10b$ according to a control command from the control device 20 of the ground portion $1b$, a battery or solar cell supplying energy for driving the sensor group $10a$ and the tether balance adjuster 11 or the actuators $10t$, $10b$, the control device, or the like may be mounted in the kite-shaped flying object 10.

The ground portion $1b$ of the power generation device of the system according to the embodiment includes a reel (rotating body) 14 on which the tether 12 connected to the kite-shaped flying object 10 and extending from the air is wound, a rotation controller 16 controlling rotation of the reel 14, a generator 18 having a rotor operatively connected to the reel 14 through the rotation controller 16, a (power generation) output regulator 19, and the control device 20. More specifically, in such a configuration, the reel shaft 15 of the reel 14 is connected to the rotation controller 16. As will be described later, when the altitude of the kite-shaped flying object 10 in the air is being increased by the wind power of the airflow (during rising), the reel 14 is rotated in a direction of unwinding the tether 12 as the tether 12 is pulled upward. The rotation is transmitted to the rotation controller 16. The rotation controller 16 regulates a rotational speed by any of methods (usually, increases the speed, and may have a braking function). The regulated rotation is transmitted to the rotor of the generator 18 through the rotor shaft 17, and in the generator 18, rotational energy is converted into electrical energy. The output terminal O of the generator 18 is connected to the output regulator 19 such as a transformer or any current controller, or a rectifier in the usual manner (for example, in the same manner as a general wind power generation), and the electrical energy obtained in the generator 18 is supplied to the power transmission network, which will be described later, as power P in the usual manner. Meanwhile, when the altitude of the kite-shaped flying object 10 in the air is being decreased (during falling), the reel 14 is rotated in a direction in which the tether 12 is wound such that the tether 12 is not slack in accordance with the falling speed of the kite-shaped flying object 10, and the tether 12 is wound on the reel 14. The winding of the tether 12 by the reel 14 may be performed by releasing the operational connection between the rotation controller 16 and the generator 18, or by rotating the reel 14 by rotation of a motor (not illustrated) separately provided in the rotation controller 16 such that the generator 18 freely rotates without generating power (for example, by turning off the field current), or may be performed by rotating the generator 18 as a motor in the direction opposite to that of power generation to rotate the reel 14 through the rotation controller 16. In addition, it is to be understood that, when the kite-shaped flying object 10 is falling, since the kite-shaped flying object 10 is falling in a direction in which the tether 12 is slack, the energy needed to rotate the reel 14 for winding the tether 12 may be substantially the energy needed to rotate the reel 14 in any of the above methods and may be significantly less than the amount of power generated by the generator 18 when the kite-shaped flying object 10 is rising.

Figure 1B:
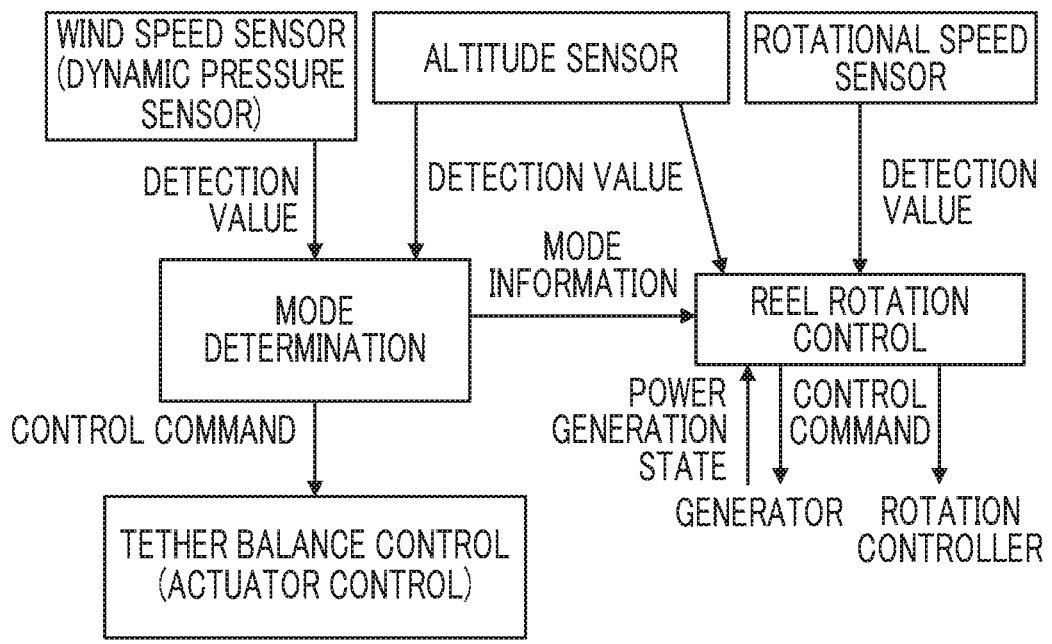
FIG. 1B is a block diagram of a control configuration of a control device of the power generation device of the power generation system according to the embodiment of the disclosure.

Control of the rising and falling of the kite-shaped flying object 10 and control of operations of the rotation controller 16, the generator 18, and the like, may be executed according to the control command from the control device 20. The control device 20 may be a computer including a central processing unit (CPU), a storage device, an input/output device (I/O) connected to one another through a bidirectional common bus in the usual manner, and the storage device may include a memory storing programs each executing processing in the power generation device, a work memory used during each processing, and a data memory storing lift force coefficients and other data. With reference to FIG. 1B, in the control configuration of the power generation device by the control device 20, first, referring to detection values from a sensor group $10a$ including a wind speed sensor, a dynamic pressure sensor, an altitude sensor or the like provided in the kite-shaped flying object 10, determination is made whether to execute the rising or falling of the kite-shaped flying object 10 rises or falls, that is, which one of a rising mode or a falling mode (mode determining unit) is to be executed, in a manner which will be described later. Then, based on the determination, a control command to the tether balance adjuster 11 or the actuators $10t$, $10b$ in the kite-shaped flying object 10 is generated for performing adjustment of the lift force generated by the kite-shaped flying object 10. The control command is provided to a controller causing the tether balance adjuster 11 or the actuators $10t$, $10b$ to be driven, whereby the lift force on the kite-shaped flying object 10 is adjusted. Information on mode determined by the mode determining unit is provided to a reel rotation controller. When the mode is the rising mode, the reel rotation controller controls operations of the rotation controller 16 and the generator 18 with reference to the rotational speed of the reel 14 detected by the rotation sensor and a generation state in the generator 18 (such as output, voltage, current, frequency of the generator 18) such that the rotation of the reel 14 is adjusted to an appropriate rotational speed through the rotation controller 16 and is transmitted to the generator 18, as described above. The control at the time of generation may be performed, for example, in the same manner as the normal wind power generation. On the other hand, when the mode is the falling mode, the reel rotation controller gives the control command to a motor of the rotation controller 16 or the generator 18 with reference to change in altitude of the kite-shaped flying object 10 such that the tether 12 is not slack in accordance with the falling of the kite-shaped flying object 10, as described above, whereby the tether 12 is wound and the reel 14 is rotated. Furthermore, during the rising mode of the kite-shaped flying object 10, the control device 20 may estimate the maximum generable power to be obtained from the generator 18 based on the lift force acting on the kite-shaped flying object 10 and estimated by the detection value of the wind speed sensor or the dynamic pressure sensor, and information (information on power to be generated) may be transmitted to a power distribution management system to be described later.

(2) Operation of Power Generation Device

Figure 1C:
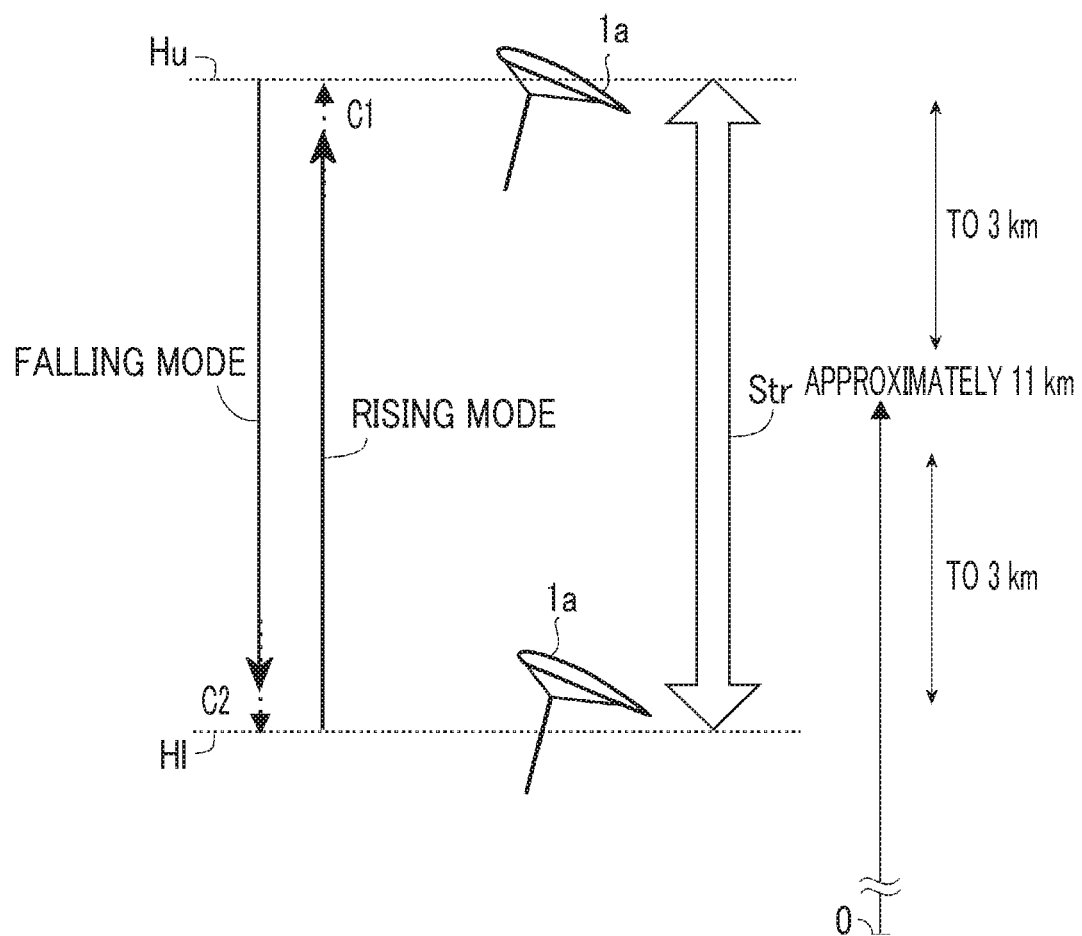
FIG. 1C is a diagram illustrating a rising and falling range of a kite-shaped flying object of the power generation system according to the embodiment of the disclosure.

As described in Summary Section, with reference to FIG. 1C, in the region of approximately 3 km above and below the altitude of approximately 11 km from the ground level, strong airflow such as a westerly wind or a trade wind is always flowing. Therefore, in the power generation device in the system according to the embodiment, it is attempted to convert the wind power of the strong airflow making the kite-shaped flying object 10 rising into electrical power energy. More specifically, in operation, as illustrated, first, the kite-shaped flying object 10 is disposed in a lower region H1 of the zone where airflow is generated. In that region, a lift force L (air force caused by the airflow) greater than the kite-shaped flying object 10's own weight mg is generated, and the kite-shaped flying object 10 rises to the upper region flu of the generation zone of the airflow by the rising action (rising mode). In the meantime, the tether 12 connected to the kite-shaped flying object 10 is unwound from the reel 14 of the ground portion 1b and rotates the reel 14. In this way, the rotational energy is converted into electrical energy by the generator 18. When the kite-shaped flying object 10 reaches the upper region Hu of the generation zone of the airflow, the shape or attitude of the kite-shaped flying object 10 is changed such that the lift force L due to the airflow is smaller than the kite-shaped flying object 10's own weight of mg. Then, the kite-shaped flying object falls due to its own weight of mg to the lower region H1 of the generation zone of the airflow. In the meantime, the reel 14 on the ground portion 1b is rotated (in the direction opposite to that at the rising mode), the tether 12 that is falling together with the kite-shaped flying object 10 is wound on the reel 14, and the kite-shaped flying object 10 is returned to the initial state such that the kite-shaped flying object 10 is disposed at the lower region H1 of the generation zone of the airflow. In this way, the kite-shaped flying object 10 repeatedly rises and falls over the stroke length Str between the altitudes H1 and Hu as described above, whereby power generation by the wind power is executed when the kite-shaped flying object 10 is rising.

The lift force generated in the kite-shaped flying object 10 can be adjusted using several methods as described above. As one exemplary method, as schematically illustrated in FIG. 2A, the tensions Tf, Tr of the front tether 12f and the rear tether 12r connected to the front portion and the rear portion of the kite-shaped flying object 10, respectively, or the lengths of the respective tethers to the tether balance adjuster 11 are adjusted. In this way, the lift force L acting on the kite-shaped flying object 10 is adjusted. In this case, specifically, since the lift force generated in the kite-shaped flying object 10 increases or decreases with respect to the pitch attitude angle as schematically illustrated in FIG. 2B, when the lift force on the kite-shaped flying object 10 is generated in the rising mode, the tensions and/or lengths of the front tether 12f and the rear tether 12r are adjusted such that the front part of the kite-shaped flying object is relatively high compared to the rear part thereof as illustrated in the upper part of FIG. 2A. This adjustment makes the pitch attitude angle of the kite-shaped flying object 10 increase (within the range that is not excessive enough to cause stalling). On the other hand, as illustrated in the lower part of FIG. 2A, when the lift force on the kite-shaped flying object 10 is reduced in the falling mode, the tensions and/or lengths of the front tether 12f and the rear tether 12r are adjusted such that the front portion of the kite-shaped flying object 10 is relatively low compared to the rear portion thereof. As described above, the adjustment of the front tether 12f and the rear tether 12r may be appropriately performed by operations of the tether balance adjuster 11 according to the control command of the control device 20 (for example, the tether balance adjuster 11 may adjust the tensions and/or lengths by wining and unwinding the front tether 12f and the rear tether 12r on and from small-sized reels, respectively, according to the control command). Further, as another exemplary method, as illustrated in FIG. 2C, the actuators 10t, 10b may be operated to change the direction of the tail of the kite-shaped flying object 10 to adjust the lift force L acting on the kite-shaped flying object 10. In this case, when the lift force on the kite-shaped flying object 10 is generated in the rising mode, the tail of the kite-shaped flying object 10 is deformed downward by extending the actuator 10t disposed on the top surface of the kite-shaped flying object 10 and contracting the actuator 10b disposed on the bottom surface of the kite-shaped flying object 10, which can lead to increase in the lift force. On the other hand, when the lift force on the kite-shaped flying object 10 is decreased in the falling mode, the tail of the kite-shaped flying object 10 is deformed upward by contracting the actuator 10t disposed on the top surface of the kite-shaped flying object 10 and extending the actuator 10b disposed on the bottom surface of the kite-shaped flying object 10, which can lead to decrease in the lift force. In any of the methods, it takes a certain amount of time to change the pitch attitude angle or change the shape of the kite-shaped flying object 10 so as to switch between the rising mode and the falling mode. In addition, since it is desirable that the moving speed of the kite-shaped flying object 10 is substantially zero at the direction switching time between the rising and the falling, the mode selection operation may be performed at the regions C1, C2 close to ends of the rising mode and falling mode, respectively, as schematically illustrated in FIG. 1C.

In the kite-shaped flying object 10, the lift force L given by the airflow is expressed as follow.

$$L = C_L \cdot \tfrac{1}{2} \cdot \rho V^2 \cdot A \qquad (1)$$

(where $C_L$ is the lift force coefficient, $\rho$ is the air density, V is the wind speed, A is the area of the kite-shaped flying object 10 to receive wind)

Figure 3A:
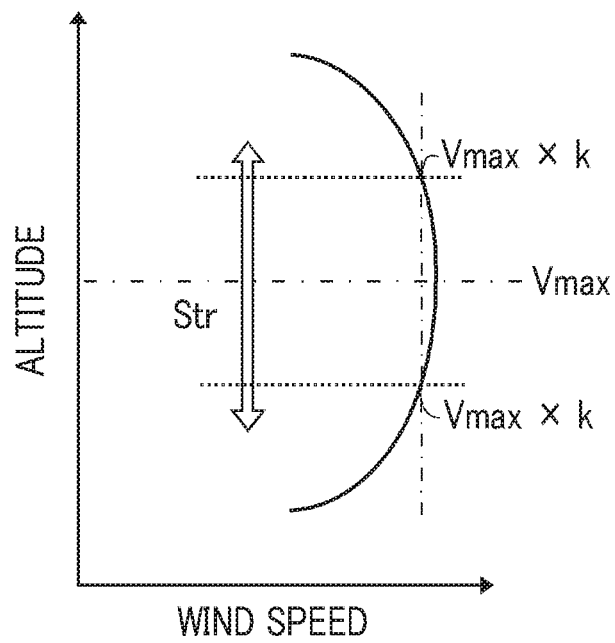
FIG. 3A is a diagram schematically illustrating a wind speed distribution and an airflow dynamic pressure distribution in a range where a westerly wind or a trade wind is generated, the range being an up-in-the-air region in which the kite-shaped flying object of the power generation system according to the embodiment of the disclosure is staying in the air.
Figure 3B:
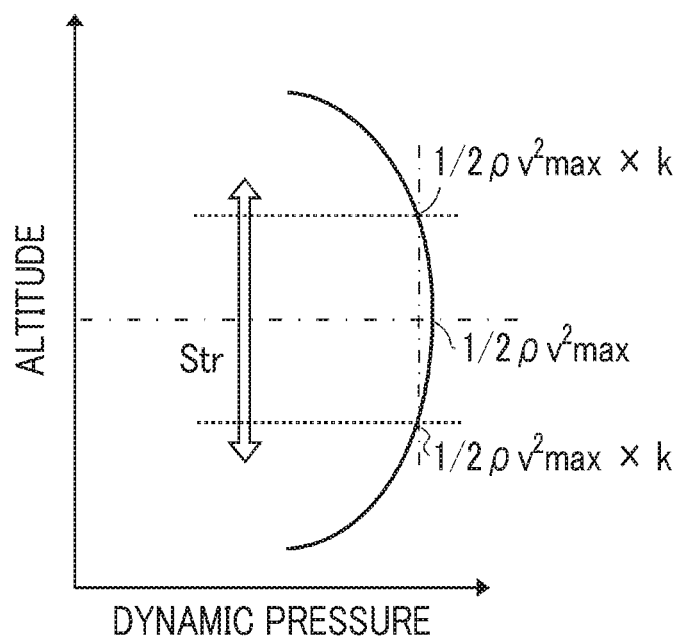
FIG. 3B is a diagram schematically illustrating a wind speed distribution and an airflow dynamic pressure distribution in the range where a westerly wind or the trade wind is generated, the range being the up-in-the-air region in which the kite-shaped flying object of the power generation system according to the embodiment of the disclosure is staying in the air.

The energy E obtained in the rising mode of the kite-shaped flying object 10 is as follows;

$$E = (L - mg) \cdot Str \qquad (2),$$

which increases together with the wind speed V and the airflow dynamic pressure ½·ρV². Therefore, in the power generation device, in order to obtain as much energy as possible, it is desirable that the kite-shaped flying object 10 may rise (and fall) at the region where the wind speed or the dynamic pressure of the airflow is as high as possible (after adjusting the pitch attitude angle or the shape of the kite-shaped flying object such that the lift force coefficient $C_L$ is maximum). In this regard, in the region where a strong airflow such as a westerly wind or a trade wind is generated, the wind speed or the dynamic pressure has a distribution which gradually decreases in the vertical direction from the altitude at which the maximum wind speed V max or the maximum dynamic pressure ½·ρV² max is generated, as schematically illustrated in FIGS. 3A and 3B. Accordingly, in this case, the kite-shaped flying object 10 may rise and fall between altitudes at which the wind speed or the dynamic pressure has a value obtained by multiplying the maximum wind speed or the maximum dynamic pressure by the positive efficient k of less than 1, for example, 0.9, in the vertical direction with the altitude at which the maximum wind speed or the maximum dynamic pressure is generated being therebetween. More specifically, switching between the rising mode and the falling mode of the kite-shaped flying object 10 may be performed at the upper and lower altitudes (mode switching altitudes) at which the value of (the maximum wind speed or the maximum dynamic pressure)×k is detected by the sensor group 10a (in addition, since it takes time to switch between modes as already mentioned earlier, the kite-shaped flying object 10 may move over the mode switching altitudes to some extent).

Figure 4:
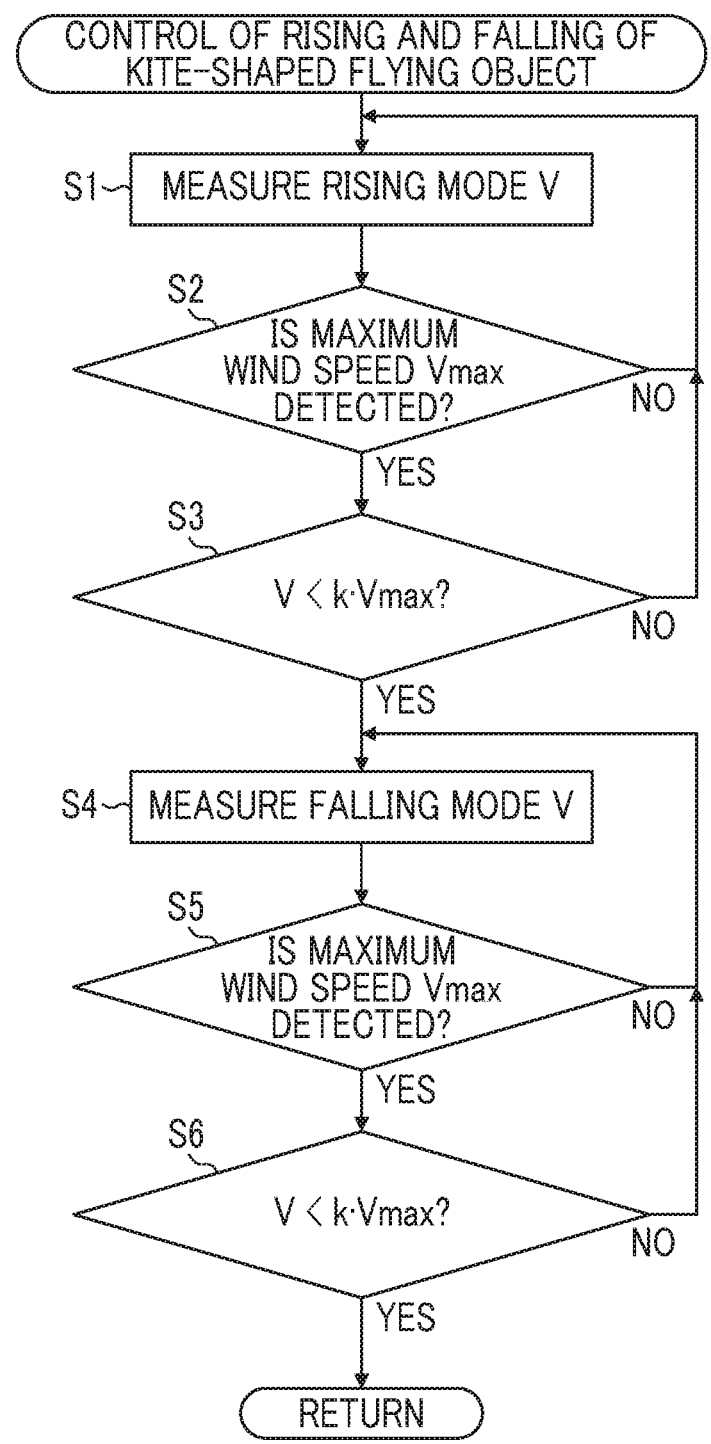
FIG. 4 is a flowchart illustrating a process procedure of switching control of rising and falling of the kite-shaped flying object of the power generation system according to the embodiment of the disclosure.

Referring to FIG. 4, control of the rising and falling of the kite-shaped flying object 10 in each power generation device of the embodiment may be performed, for example, as follows. First, the kite-shaped flying object 10 is set to be in the rising mode, and therefore receives the lift force and is lifted up into the air(step 1). During the lifting up of the kite-shaped flying object 10 into the air, the wind speed of the airflow received by the kite-shaped flying object 10 is measured by the sensor group. Then, it is checked whether or not the measured wind speed has reached the maximum wind speed (step 2) (it may be assumed that the maximum value is detected at the time point at which the measured value (an average value excluding noise, transient fluctuation, or the like) turns from increase to decrease), and the rising mode continues even after the altitude at which the wind speed reaches the maximum wind speed has been detected. Then, while the kite-shaped flying object 10 continues to rise further, when the measured wind speed is below the value obtained by multiplying the maximum wind speed by a positive coefficient k of less than 1 (step 3), determination is made that the kite-shaped flying object reaches the vicinity of the upper limit of the airflow and the kite-shaped flying object 10 is set to be in the falling mode. When the moving speed of the kite-shaped flying object 10 is zero, the kite-shaped flying object 10 starts falling (step 4). Then, it is checked whether or not the measured wind speed is the maximum wind speed (step 5), and even after the altitude at which the wind speed is the maximum wind speed is detected, the falling mode continues. When the measured wind speed is below the value obtained by multiplying the maximum wind speed by a positive coefficient k of less than 1 (step 6), determination is made that the kite-shaped flying object 10 reaches the vicinity of the lower limit of the airflow and the kite-shaped flying object 10 is set to be in the rising mode (return to step 1). In this way, the cycle of rising and falling is repeated. Furthermore, in FIG. 4, instead of the wind speed, a dynamic pressure of the airflow may be measured and the measured value may be used for determination for mode switching (steps 2, 3, 5, 6).

In each of the power generation devices in the embodiment, the output power P that can be substantially obtained in the generator is given using the rising speed v of the kite-shaped flying object 10 as follows.

$$P = (L - mg) \cdot v \tag{3}$$

As already mentioned earlier, the lift force L is determined by the wind speed or the dynamic pressure received by the kite-shaped flying object 10 and the lift force coefficient $C_L$, and the $C_L$ is determined by the pitch attitude angle (or shape of the kite-shaped flying object). Therefore, the output power P under a certain wind condition is determined by adjusting the pitch attitude angle (or the shape of the kite-shaped flying object) and the rising speed v of the kite-shaped flying object 10. In this regard, in a case where a synchronous machine or an induction machine is employed as a generator, the frequency of the output voltage corresponds to the number of revolutions of the rotor, and the number of revolutions of the rotor is determined by the rising speed v of the kite-shaped flying object 10. As a result, the rising speed v of the kite-shaped flying object 10 is adjusted to the speed $v_r$ at which the frequency of the output voltage is set to a desired value. Therefore, when the pitch attitude angle (or the shape of the kite-shaped flying object) is controlled such that the lift force L has the maximum value Lmax, the maximum generable power Pg of each of the power generation device is given as follows.

$$Pg = (L \max - mg) \cdot v_r \tag{4}$$

In addition, when a direct current machine or an inverter generator is employed as s generator, the rising speed v may be set to a maximum value $v_{rm}$ that can be allowed or generated in the generator or the kite-shaped flying object. In this case, the maximum generable power Pg of each of the power generation devices is given as follows.

$$Pg = (L \max - mg) \cdot v_{rm} \tag{5}$$

Control of the rising speed v of the kite-shaped flying object 10 may be achieved in any of methods, for example, by adjusting impedance of the generator, as in the wind power generation in the related art.

Power Distribution Management in Power Generation System (Power Supply Control)

As understood from the above description, in each of the power generation devices according to the embodiment, output power depends on the strength of the airflow received by the kite-shaped flying object 10, and is generated just during the execution of the rising mode of the kite-shaped flying object 10. Therefore, just one power generation device or a power generation device in only one place cannot always stably supply power needed by a certain power receiving facility. As already mentioned earlier, in the power generation system according to the embodiment, output power of power generation devices installed at different places is supplied to the power transmission network, and the power generation devices can cooperate to stably meet the power demand of the power receiving facility.

(1) Configuration of Power Generation System

Figure 5A:
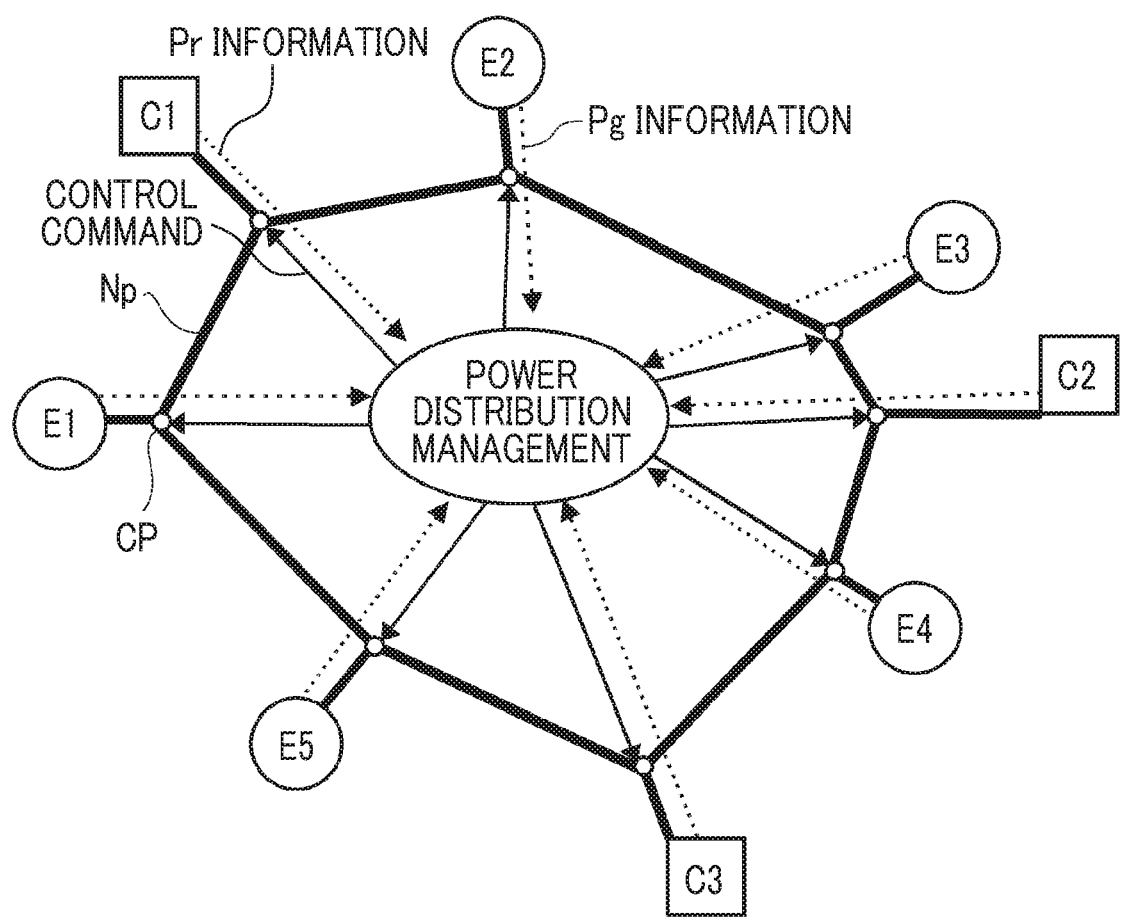
FIG. 5A is a conceptual diagram of a system configuration of the power generation system according to the embodiment of the disclosure.

As illustrated in FIG. 5A, in the power generation system according to the embodiment, power generation devices E1 to E5 installed at different places are each connected to the power transmission network Np to which at least one power receiving facility (three facilities C1 to C3) is connected in a manner that the power generation devices are capable of supplying power. As already mentioned earlier, the power receiving facility may be a facility such as a house, a factory, a business office, or the like, or equipment for supplying power to a moving object (vehicle), a rechargeable battery, and the like. Information on the momentary maximum generable power Pgi from each power generation device Ei and information on the target power Pri requested from moment to moment by each power receiving facility C1 are provided to the power distribution management system (power supply controller), and the power supply distribution management system determines power to be supplied from each power generation device Ei to each power receiving facility C1 based on received information on the maximum generable power Pgi and information on the target power Pri. According to the distribution, the control command to switch between wirings of the power transmission network is transmitted to a connection point CP of the power transmission network. The above-mentioned process of the power distribution management system through the power transmission network may be implemented by a computer commonly used in the control of a power system including a distributed power supply. It is to be understood that the configuration and operation of each portion of the system are implemented by operations of the computer according to programs. The power transmission network system commonly used in the field may be used as the power transmission network.

(2) Aspect of Power Distribution

Figure 5B:
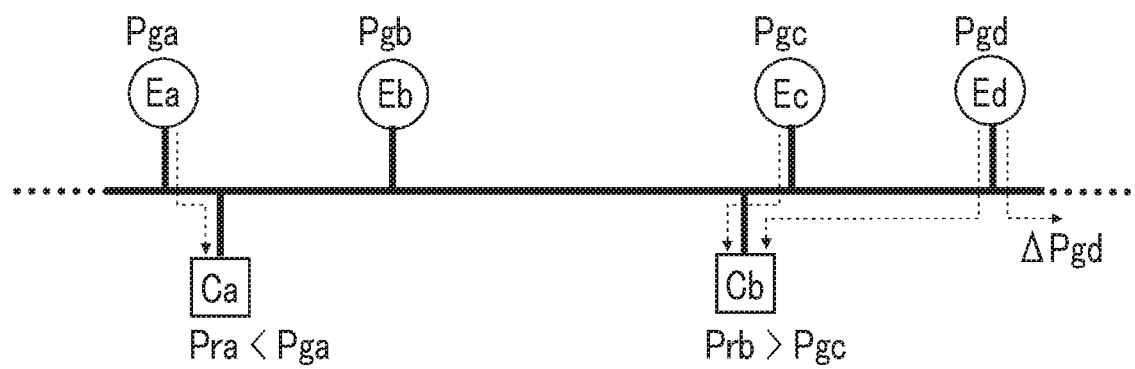
FIG. 5B is a diagram schematically illustrating an example of an aspect of power supply control (power distribution) of the power generation system according to the embodiment of the disclosure.

In the power distribution in the power generation system according to the embodiment, as schematically illustrated in FIG. 5B, in one aspect, when the target power Pra of one power receiving facility Ca does not exceed the maximum generable power Pga of one power generation device Ea, the output power of the power generation device Ea may be supplied to the power receiving facility Ca (when the power to be supplied from one power generation device Ea is less than the maximum generable power Pga, the lift force L or the rising speed v of the kite-shaped flying object may be adjusted or the rechargeable battery or the like may be charged with surplus power in order to reduce the power output from the power generation device). On the other hand, when the target power Prb of the power receiving facility Cb exceeds the maximum generable power Pgc of the power generation device Ec, power from another power generation device Ed may be supplied to the power receiving facility Cb. Here, in order to shorten the power transmission distance as much as possible to suppress power loss, the power generation device having the shortest distance from the power receiving facility is selected as the power generation device to supply power to the power receiving facility (in the illustrated example, the power receiving facility Ca is matched to the power generation device Ea, and the power receiving facility Cb is matched to the power generation device Ec). However, when the target power of the power receiving facility is not met by the above-mentioned process, even power from the power generation device having the next shortest distance may be supplied (in the illustrated example, with respect to the power receiving facility Cb, the power generation device Ed corresponds to the next shortest distance therefrom). In addition, the power generation device Eb having no power supply destination may be inactive. Furthermore, when the power to be supplied does not exceed the maximum generable power in the power generation device Ed, the power generation device Ed may supply power to a plurality of power receiving facilities.

Figure 5C:
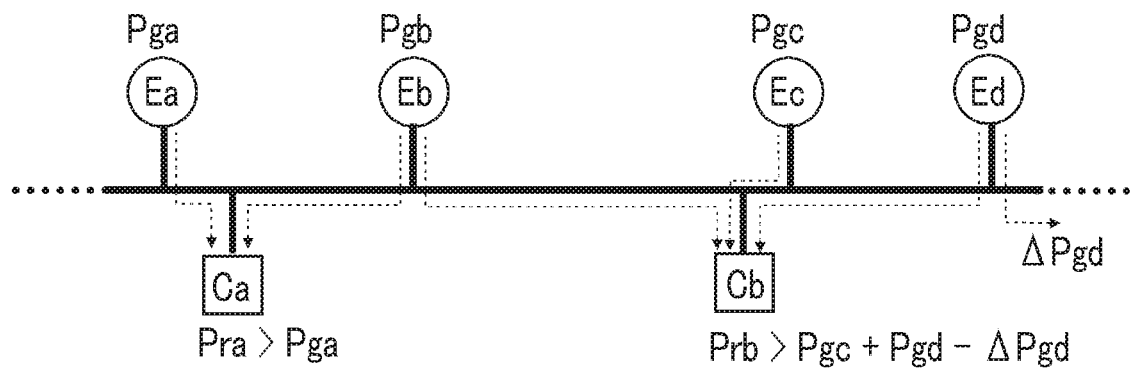
FIG. 5C is a diagram schematically illustrating another example of the aspect of power supply control (power distribution) of the power generation system according to the embodiment of the disclosure.

Thus, after lapse of time, in the one power generation device Ea that has been supplying power to the one power receiving facility Ca, when the maximum generable power Pga of the power generation device Ea is changed, for example, due to change in wind conditions in the air or the start of the falling mode of the kite-shaped flying object and thus cannot meet the target power Pra of the power receiving facility Ca, power from the power generation device having the next shortest power generation device Eb is supplied to the power receiving facility Ca as described above, as illustrated in FIG. 5C. In addition, when just the power that has been supplying power to the one power receiving facility Cb (the maximum generable power of the power generation device Ec and the power suppliable from the power generation device Ed, Pgd−ΔPgd) does not meet the target power Prb due to change in wind conditions at each region or change in the target power of the power receiving facility, additional power may be supplied from the power generation device Eb with extra capacity.

Figure 6:
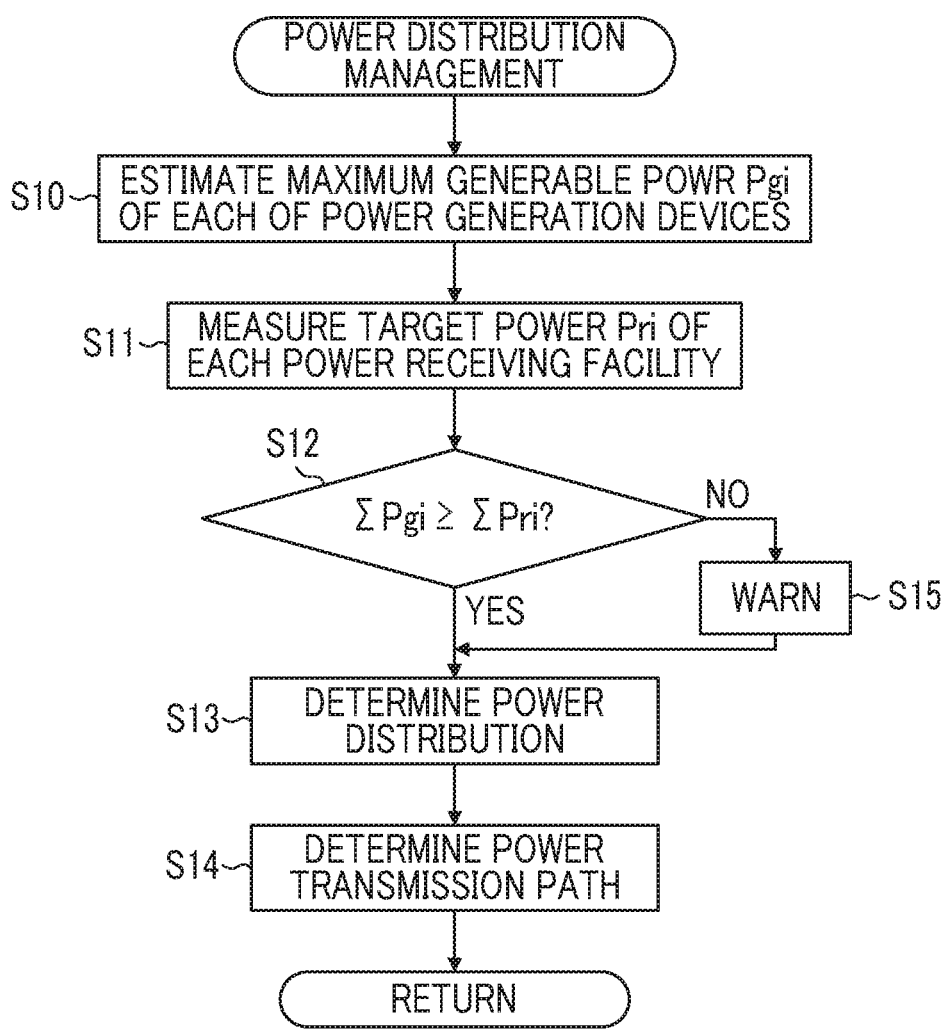
FIG. 6 is a flowchart illustrating a process procedure of power distribution control of the power generation system according to the embodiment of the disclosure.

In specific operations of the power distribution management system in the power generation system according to the embodiment, the process illustrated in FIG. 6 may be repeatedly executed from moment to moment (every predetermined cycle time). More specifically, first, with reference to the strength of the airflow (wind speed or dynamic pressure) received by the kite-shaped flying object of each power generation device, the value Pgi of the maximum generable power of the each power generation device estimated based on the above equation (4) or (5) is collected (step 10). Here, for the lift force coefficient $C_L$, values that have been experimentally measured in advance using the pitch attitude angle or the shape of the kite-shaped flying object may be used as a parameter. The air density p may be calculated based on the measurement value of the barometric pressure (static pressure). The rising speed v may be set based on the specifications of the generator. In addition, the estimation of the value Pgi of the maximum generable power may be made in each power generation device, and may be made in the power distribution management system. Next, the value Pri of the target power detected at each power receiving facility is collected (step 11). The collection of the value Pri of the target power may be achieved in any of methods, for example, by measuring power actually received or consumed at each power receiving facility, or by aggregating in advance information on equipment consuming power to be used at each of the power receiving facility. Then, determination is made whether or not the sum ΣPgi of the values Pgi of the maximum generable powers of power generation devices is larger than the sum ΣPri of the values Pri of target powers of respective power receiving facilities (step 12). Here, ΣPgi≥ΣPri is established, the process of determining power distribution is executed (step 13).

In the process of determining power distribution, as described above, the power distribution from each of the power generation devices to each power receiving facility is determined based on the maximum generable power of each of the power generation devices and target power of each power receiving facility, such that the power corresponding to the target power of each power receiving facility is supplied from each of the power generation devices. In one form of a specific algorithm, first, from among power receiving facilities, the power receiving facility having the shortest power transmission distance from each of the power generation devices is preferentially selected as a supply destination of each of the power generation devices. Then, when the power to be supplied does not meet the target power of the power receiving facility, the power of the power generation device closest to the power receiving facility from among power generation devices having remaining suppliable power is allocated to the power receiving facility. The allocation process may be repeated until target powers of all the power receiving facilities are met. In another form of the specific algorithm, a combination of power distribution from each of the power generation devices to each of the power receiving facilities, which makes shortest the total power transmission distance of power from each of the power generation devices to each of the power receiving facilities, may be calculated (it can be achieved by selecting, from among various combinations, the combination that provides the shortest total power transmission distance). Furthermore, in still another form of specific algorism, a combination of power distribution from each of the power generation devices to each of the power receiving facilities, which makes smallest power loss from each of the power generation devices to each of the power receiving facilities, may be calculated (it can be achieved by selecting, among various combinations, the combination that minimizes the sum of (distributed power)×(power transmission distance)).

When $\Sigma Pgi \geq \Sigma Pri$ is not established in step 12, since the power generation by all power generation devices at that time point cannot cover the whole target power of the power receiving facility, a warning may be issued to that effect (step 15). Then, in the process for determining power distribution (step 13), in some power receiving facilities, power distribution may be determined in the same manner as described above, by selecting power to be supplied to be below the target power, or by selecting power to be supplied to the power receiving facility as a whole to be below the target power.

When power distribution is determined as described above, the control command to the connection point CP of the power transmission network is provided to achieve the distribution, and the power transmission path is established (step 14). In addition, in each power generation device, the lift force generated in the kite-shaped flying object or the rising speed thereof may be adjusted such that the power supply allocated to it matches the generated power.

In the embodiment described above, the system is constructed such that power can be transmitted cooperatively from the power generation devices using kite-shaped flying objects to the power receiving facility connected to the power transmission network. Therefore, even if power suppliable from one power generation device or a power generation device at one place is reduced due to changes in wind conditions or the start of the falling mode of the kite-shaped flying object, since power is supplied to the power transmission network from another power generation device which is disposed at a place where the wind conditions are different or which is in the rising mode, it is expected that power needed by the power receiving facility can be stably supplied.

Although the description has been made with the embodiment of the disclosure, it is to be apparent that various modifications and changes will readily occur to those skilled in the art, and the disclosure is not limited to the embodiments described above and is applied to various devices without departing from the spirit of the disclosure.

What is claimed is:

1. A power generation system that supplies power to at least one place, the power being obtained by converting energy of wind power received by a kite-shaped flying object staying in the air, the power generation system comprising:

a plurality of power generation devices installed at separate places, each configured to include a kite-shaped flying object staying in the air, a generator installed on a ground and a tether having one end connected to the kite-shaped flying object and the other end wound on a rotating body operatively connected to a rotor of the generator, the generator outputting power when the rotor is rotated by the tether being pulled and unwound from the rotating body as the kite-shaped flying object receiving wind power from airflow in the air rises;

at least one power receiving facility configured to receive or consume power;

a power transmission network configured to transmit power from each of the power generation devices to each power receiving facility; and a power supply controller, implemented using at least a computing device, is configured to control power supply from each of the power generation devices to each power receiving facility through the power transmission network, wherein the power supply controller is configured to control power supply from each of the power generation devices to each power receiving facility such that when a target power, which is a power needed by any one power receiving facility, is met by a suppliable power, which is a power supplied from one of the power generation devices, power is supplied from the one power generation device to the one power receiving facility through the power transmission network, when the target power of the one power receiving facility exceeds the suppliable power supplied from the one of the power generation devices, power from one or more of the other power generation devices is supplied to the one power receiving facility through the power transmission network in addition to the power from the one power generation device, so as to meet the target power of the one power receiving facility, wherein the power supply controller is configured to select, from among the power generation devices, a power generation device having a shortest power transmission distance to one power receiving facility as a power generation device to transmit power to the one power receiving facility.

2. The power generation system according to claim 1, wherein when the target power of the one power receiving facility exceeds a suppliable power supplied from the selected power generation device, select a power generation device having a next shortest power transmission distance to the one power receiving facility.

3. The power generation system according to claim 2, wherein the power supply controller is configured to select, from among the power generation devices, one or more of the power generation devices to supply power to one power receiving facility, in ascending order of the power transmission distance to the one power receiving facility, such that a total amount of power supplied from the selected power generation devices to the one power receiving facility meets the target power of each power receiving facility.

4. The power generation system according to claim 1, wherein the power supply controller is configured to preferentially select, from among the at least one power receiving facility, a power receiving facility having the shortest power transmission distance from each of the power generation devices as a power supply destination of each of the power generation devices.

5. The power generation system according to claim 1, wherein the power supply controller is configured to determine, based on a maximum generable power of each of the power generation devices and the target power of each power receiving facility, power distribution from each of the power generation devices to each power receiving facility such that a power corresponding to each target power is supplied from each of the power generation devices to each power receiving facility.

6. The power generation system according to claim 5, wherein the power supply controller is configured to determine power distribution from each of the power generation devices to each power receiving facility such that a total power transmission distance of the power supplied from each of the power generation devices to each power receiving facility is the shortest.

7. The power generation system according to claim 5, wherein the power supply controller is configured to determine power distribution from each of the power generation devices to each power receiving facility such that loss of the power transmitted from each of the power generation devices to each power receiving facility is minimized.

8. The power generation system according to claim 1, wherein in each of the power generation devices, the kite-shaped flying object rises or falls between altitudes above and below an altitude where a maximum wind speed or a maximum dynamic pressure is observed in the air, the altitudes being altitudes at which a wind speed or a dynamic pressure having a value obtained by multiplying the maximum wind speed or the maximum dynamic pressure by a positive coefficient of less than 1 is observed.

9. The power generation system according to claim 1, wherein the kite-shaped flying object rises and falls in an altitude region where a westerly wind or a trade wind is generated.

10. The power generation system according to claim 1, wherein the kite-shaped flying object rises and falls in an altitude region in a range of approximately 3 km above and below an altitude of approximately 11 km from a ground level.

11. The power generation system according to claim 1, wherein the kite-shaped flying object is provided with a wind speed detecting unit that detects wind speed of an in-the-air region where the kite-shaped flying object is staying, and a maximum generable power estimating unit that estimates a maximum generable power in a corresponding power generation device based on the detected wind speed.

12. The power generation system according to claim 1, wherein:
    the kite-shaped flying object is provided with an airflow dynamic pressure detecting unit that detects airflow dynamic pressures in an in-the-air region where the kiteshaped flying object is staying; and
    the power generation system further includes a maximum generable power estimating unit that estimates a maximum generable power in a corresponding power generation device based on the detected airflow dynamic pressure.

13. The power generation system according to claim 1, further comprising a pitch attitude angle controller configured to control a pitch attitude angle of the kite-shaped flying object of each of the power generation devices to control a magnitude of a lift force received by the kite-shaped flying object.

14. The power generation system according to claim 1, further comprising a kiteshaped flying object shape controller configured to control a shape of the kite-shaped flying object of each of the power generation devices to control a magnitude of a lift force received by the kite-shaped flying object.

* * * * *